No. 875,398. PATENTED DEC. 31, 1907.
G. T. WILLIS.
HAND BAG.
APPLICATION FILED APR. 16, 1907.
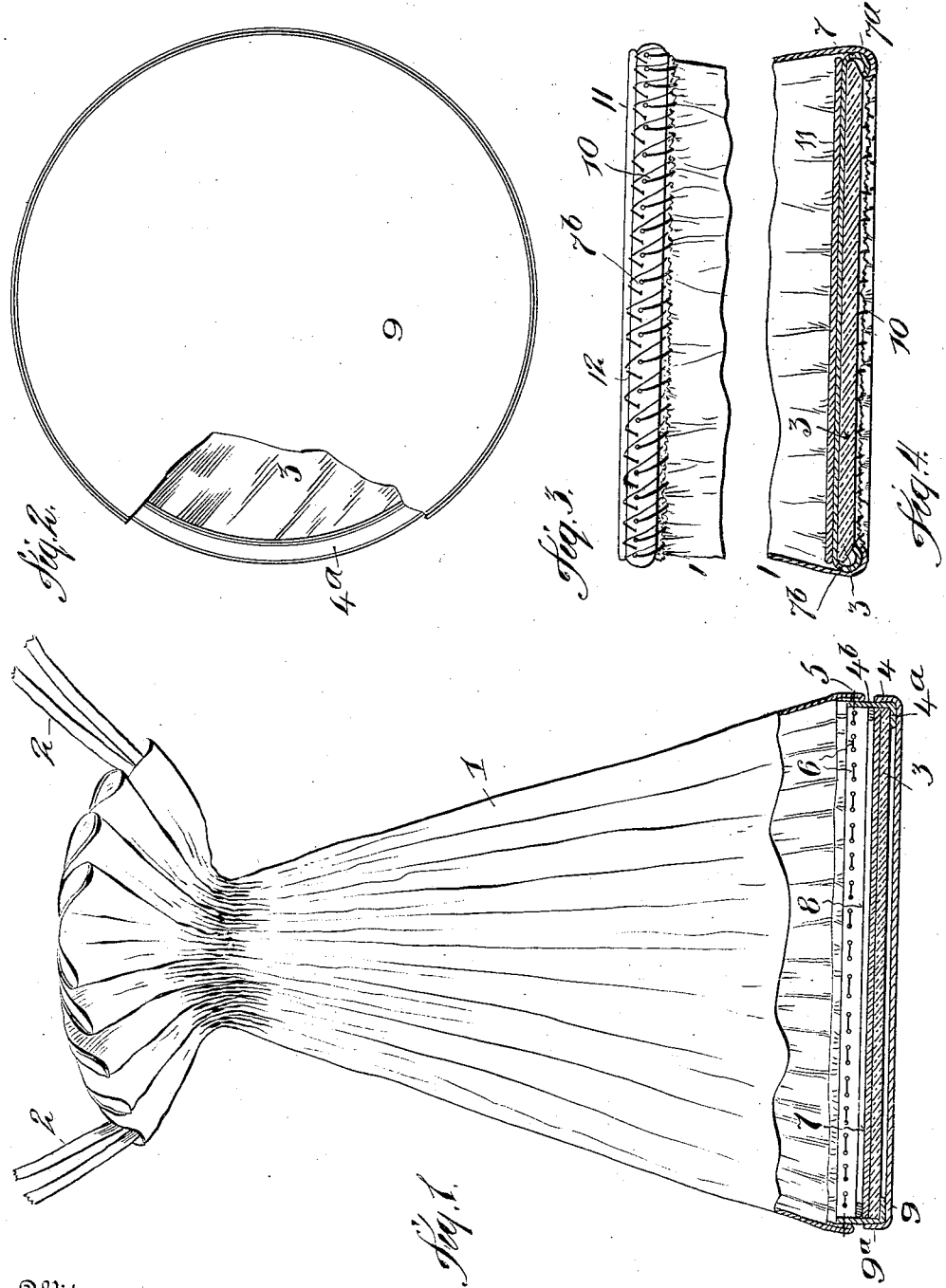

UNITED STATES PATENT OFFICE.

GEORGINA T. WILLIS, OF NEW YORK, N. Y.

HAND-BAG.

No. 875,398.  Specification of Letters Patent.  Patented Dec. 31, 1907.

Application filed April 16, 1907. Serial No. 368,579.

*To all whom it may concern:*

Be it known that I, GEORGINA T. WILLIS, a citizen of the United States, residing at New York city, borough of Brooklyn, New York, have invented certain new and useful Improvements in Hand-Bags, of which the following is a specification.

The object of my invention is to provide a hand bag or reticule for women with a mirror arranged in convenient position for use as desired, and my invention comprises a suitable flexible bag having at its bottom a mirror exposed outwardly, and which mirror, or the mirror and its supporting frame, form part of the bag structure, such as its bottom.

My invention also comprises novel details of improvement hereinafter more fully set forth and then pointed out in the claims.

Reference is to be had to the accompanying drawings forming part hereof, wherein, Figure 1 is a side view, partly in section, of a hand bag or reticule embodying my invention, Fig. 2 is an end view thereof, part of the cover being broken away; Fig. 3 is a detail edge view, illustrating the bag turned inside-out and showing modified means for attaching the back and mirror together, and Fig. 4 is a cross section thereof showing the bag in position for use.

The numeral 1 indicates, generally, a flexible tubular bag-like member shown pro provided at its open end or mouth with running strings 2, connected therewith in well-known manner for closing the bag and suspending the same, and at 3 is a mirror or looking glass attached to the lower end of the bag, with the reflecting portion exposed outwardly. The mirror is shown provided with a holding frame or ring 4 encircling the mirror and having a lower flange $4^a$ against which the mirror rests, and an upwardly extending flange $4^b$ to which the bag 1 is attached, as by stitches 5 passing through the bag and through suitable perforations 6 in flange $4^b$, whereby the mirror is suspended across the lower end of the bag, is protected on its edges by frame 4, and practically forms the bottom of the bag. At 7 is a back or disk of suitable material, such as cardboard, which may be covered with cloth or silk as desired, and which rests against the back of the mirror, protects the mercury or reflecting medium on the back thereof, and lies within flange $4^b$. An additional ring 8 of suitable material may be sprung or pushed into flange $4^b$ behind backing 7 to assist in holding the latter in place. At 9 is a cap or cover having flange $9^a$ adapted to fit over the mirror and engage the flange $4^b$. Said cover will be snugly fitted in place and adapted to be readily removed for inspection of the mirror, and also protects the mirror from injury and soiling.

In Figs. 3 and 4 the mirror 3 is shown protected by a flange $7^a$ projecting from the backing 7, which flange is shown provided with apertures $7^b$, and the lower end of the material of the bag is brought under flange $7^a$ and stitched thereto by the stitches 10 passing through material 1 and through the apertures $7^b$ of flange $7^a$. Bag 1 may be so attached to flange 7 by first turning the bag inside-out and stitching it to the flange, as in Fig. 3, and then pushing the mirror through the bag so that the reflecting surface appears exposed at the bottom of the bag, the bag then inclosing flange 7 as shown in Fig. 4. The mirror may also be provided with suitable backing 11 of cardboard or the like, covered with cloth or silk if desired, which may also be stitched to flange 7 through aperture $7^b$ as by stitches 12, (Fig. 3).

With my improvements a flexible bag or reticule may be used and carried in manner customary with flexible hand bags, and may be made of silk, leather, or other suitable material, and while the mirror forms the bottom of the bag and keeps the same stretched at the bottom, the mirror is also in position for use by merely inverting the back for inspection of the mirror, and when the cover is used over the mirror it may be readily removed and replaced, and also protects the mirror as before stated.

Having now described my invention what I claim is:

1. A hand bag comprising a tubular flexible body provided with a mirror secured thereto at and closing the lower end and having its reflecting surface exposed outwardly below the bag, a protector within said body at the back of the mirror, and a cover detachably secured over the mirror to protect its outer surface.

2. A hand bag comprising a tubular body of flexible material, means to close and support its upper open end, and a mirror provided along its edge with a flange secured to the lower end of the bag body and exposed outwardly below the bag, and a protector over the back of the mirror within said tubular body.

3. A hand bag comprising a tubular body of flexible material, means to close and support its upper open end, a mirror secured to the lower end of the bag body and constituting a closure for the lower end of the body, and exposed outwardly below the body, and a protector within the bag lying over the reflecting medium of the mirror.

4. A hand bag comprising a flexible body, a mirror having its reflecting surface exposed outwardly, a frame attached to the mirror and having a flange extending upwardly, and means securing the bag body to said flange.

5. A hand bag comprising a flexible body, a mirror having its reflecting surface exposed outwardly, a frame attached to the mirror and having a flange extending upwardly, and means for securing the bag to said flange, said frame having a flange extending in front of the mirror at its edge.

6. A hand bag comprising a flexible body, a mirror having its reflecting surface exposed outwardly, a frame attached to the mirror and having a flange extending upwardly, means securing the bag body to said flange, said frame having a flange extending in front of the mirror at its edge, and a cover having a flange detachably fitting said frame.

7. A hand bag comprising a body of flexible material provided at its open end with running strings, a mirror at the opposite end having its reflecting surface exposed outwardly beneath the bag, a frame encircling the mirror and provided with a flange in front of the mirror at its outer edge, said frame also having an upwardly extending flange, stitches securing the bag body to the last named flange, and a protector within the bag overlying the reflecting medium of the mirror.

8. A hand bag comprising a body of flexible material provided at its open end with running strings, a mirror at the opposite end having its reflecting surface exposed outwardly beneath the bag, a frame encircling the mirror and provided with a flange in front of the mirror at its outer edge, said frame also having an upwardly extending flange, stitches securing the bag body to the first named flange, a protector within the bag overlying the reflecting medium of the mirror, and a cover over the mirror having a flange detachably engaging said frame.

GEORGINA T. WILLIS.

Witnesses:
T. F. BOURNE,
MARIE F. WAINRIGHT.